(No Model.) 2 Sheets—Sheet 1.

J. R. HARD.
GALVANIC BATTERY CELL.

No. 364,344. Patented June 7, 1887.

WITNESSES:
E. B. Bolton
Frank Moulin

INVENTOR:
J. Randolph Hard
By his Attorney,
Henry Donnett

N. PETERS, Photo-Lithographer, Washington, D. C.

(No Model.) 2 Sheets—Sheet 2.

J. R. HARD.
GALVANIC BATTERY CELL.

No. 364,344. Patented June 7, 1887.

Fig. 3ª.

WITNESSES:
E. B. Bolton
Frank Moulin

INVENTOR:
J. Randolph Hard
By his Attorney,
Henry Connett

UNITED STATES PATENT OFFICE.

J. RANDOLPH HARD, OF NEW YORK, N. Y.

GALVANIC-BATTERY CELL.

SPECIFICATION forming part of Letters Patent No. 364,344, dated June 7, 1887.

Application filed October 6, 1886. Serial No. 215,428. (No model.)

*To all whom it may concern:*

Be it known that I, J. RANDOLPH HARD, a citizen of the United States, and a resident of the city, county, and State of New York, have invented certain new and useful Improvements in Battery-Cells, of which the following is a specification.

My invention relates to cells for electrical batteries in general; but my cell is especially well adapted for medico-electrical batteries.

The principal object of my invention is to provide a means for stripping the zinc when it is withdrawn, whereby all the surplus battery-liquid and the débris of chemical decomposition is removed therefrom. Thus the zinc is thoroughly cleaned and the dripping therefrom of surplus liquid prevented. This, with other novel features of the invention, will be hereinafter described, and carefully defined in the claims.

Figure 1:
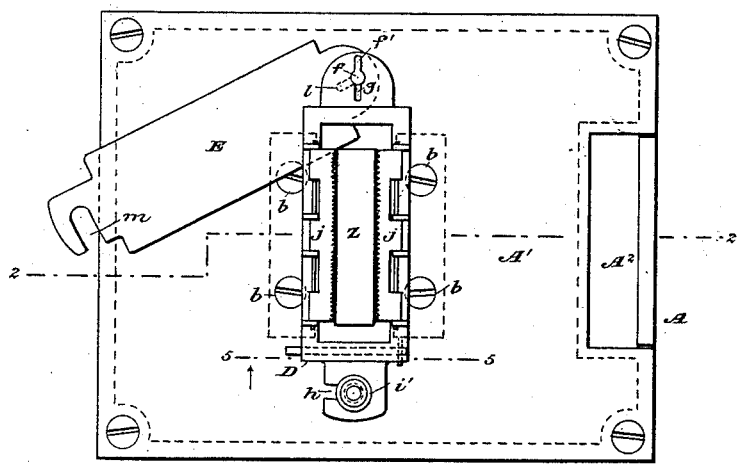
Figure 2:
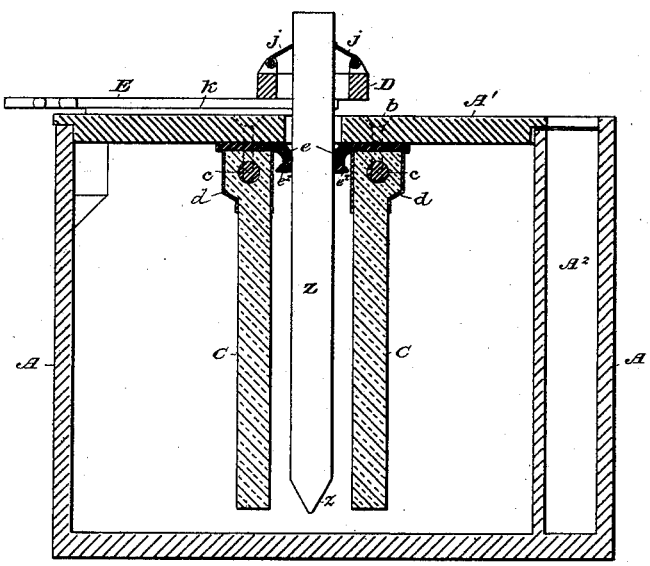
Figure 3:
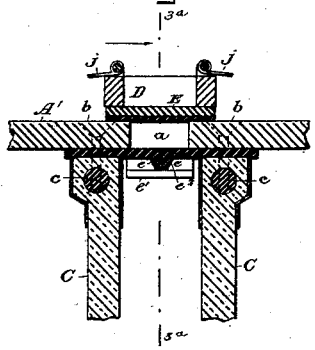
Figure 4:
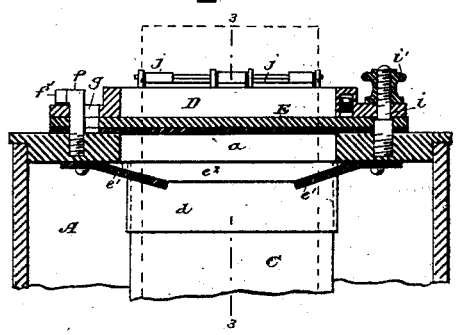
Figure 4:
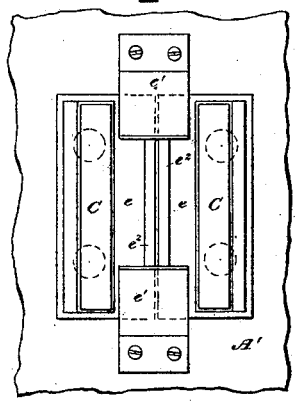
Figure 5:
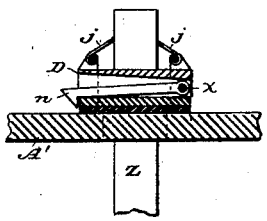
Figure 6:
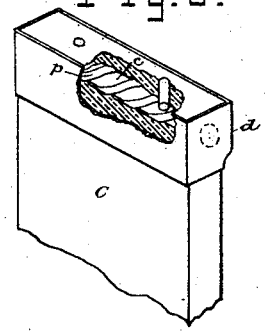

In the drawings which serve to illustrate my invention, Figure 1 is a plan of the cell, showing the zinc in place; and Fig. 2 is a section of same, taken in the plane of line 2 2 in Fig. 1. Fig. 3 is a fragmentary section similar to Fig. 2, showing the position of the parts when the zinc is removed; and Fig. $3^a$ is section on line $3^a$ $3^a$ in Fig. 3. Fig. 4 is a view of the under side of the cell-cover, as seen in Figs. 3 and $3^a$. Fig. 5 is a fragmentary sectional view taken on line 5 5 in Fig. 1. Fig. 6 is a perspective view of one of the carbons, which will be referred to hereinafter. Figs. 7, 8, 9, and 10 illustrate slight modifications, that will be hereinafter described.

Let A represent the liquid-receptacle of the cell, and A' its cover, rabbeted to fit onto the upper edge of the receptacle, and secured in place removably by screws. The receptacle herein shown is of rectangular or box-like shape, and is constructed of hard rubber, and it has a zinc holder or receptacle, $A^2$, formed integrally with it by partitioning off a space at its end. I may, however, make the receptacle of any suitable material—as glass or gutta-percha, for example—and of any convenient form—as cylindrical, elliptical, or polygonal, for example.

In the cover A' is formed an aperture, $a$, for the insertion of the zinc Z, and to the under side of the cover are secured the carbons C C. These are alike, and a description of one with its attaching devices, &c., will suffice. In the carbon, near its upper end, is fitted and embedded a piece of metal, $c$, to form a nut, and the attaching screws $b$ pass down through the cover A' and screw into said piece or block of metal $c$. I prefer, for convenience, to drill a hole edgewise through the carbon and slip into this a round rod, $c$, as shown; but the metal piece $c$ may be of any convenient form and be fitted into the carbon in any convenient way, and it may be in two pieces—one for each screw—if desired. As the screw or screws $b$ will be employed for taking off the current from the carbon pole, I prefer to insure electrical contact between the metal $c$ and the carbon by wrapping around the metal $c$ a thin strip or wire, $p$, of platinum, as seen in Fig. 6, and to protect the metallic connections of the carbon at its upper end I prefer to apply to this end of the carbon a protecting covering, $d$, of soft rubber or similar impervious material.

Figure 10:
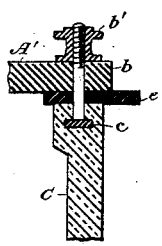

In Fig. 10 I show the metal piece $c$ in the form of a plate or flat strip embedded in the substance of the carbon in the process of making the same. This view also shows the attaching-screw $b$ attached permanently to said strip $c$ before its embedment in the carbon, and a nut, $b'$, screwed onto the upper projecting end of said screw.

Figure 7:
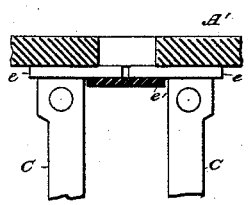
Figure 8:
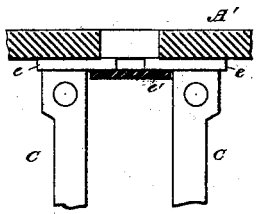
Figure 9:
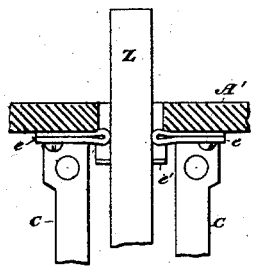

Between the ends of the carbons C and the cover A' are clamped two lateral flaps, $e\ e$, of soft rubber or other like yielding and elastic material, which project out and preferably meet between the carbons, so as to cover or close the aperture $a$, through which the zinc is inserted, as seen in Figs. 3 and 4. Two edge flaps, $e'\ e'$, are also secured to the cover, as seen in Fig. 4. When the zinc Z is inserted, it displaces these flaps, as seen in Fig. 2, but they press against it by reason of their elasticity, and when the zinc is withdrawn from the liquid they serve as strippers to remove from it all superfluous liquid, so that it will not drip. They also remove all the loose débris of chemical decomposition usually found adhering to the zinc. In order that these strippers may also remove the surplus liquid from the lower end of the zinc, I prefer to give to this end a wedge form, as seen at $z$ in Fig. 1. I prefer also to form a V-like pendent rib or projection on the free edges of the lateral flaps $e$, as seen at $e^2$ in Figs. 2 and 3, in order that the liquid may the more readily drip therefrom back into the receptacle; but this I do not consider essential, nor do I consider it essential that the flaps $e$ shall meet when the zinc is out, as seen in Fig. 3. In Fig. 7 I have shown these flaps unprovided with the projections $e^2$. In Fig. 8 I have shown them as not meeting at their free edges, but projecting out into the path of the zinc, and in Fig. 9 I have shown the rubber of the flap folded and projecting only a very little way into the path of the zinc.

D is a frame to hold the zinc. This frame is hinged to the cover A' by means of a vertical stud, $f$, so as to swing laterally; and in order that the frame D may be conveniently removed when desired, I provide this stud, which is secured in the cover A', with a laterally-projecting head, $f'$, which is narrower than the stud-shank, and provide the hinging end of the frame with a slot, $g$, extending out from the hole through which the stud passes. By swinging the frame around until slot $g$ coincides with the head $f'$ the frame may be lifted off from the stud. This hinging attachment renders the frame D readily detachable for cleaning and refilling the cell. At its free end the frame D is provided with a notch, $h$, which engages a stud, $i$, in the cover A', the upper end of which is screw-threaded to receive a thumb-nut, $i'$.

On the upper edges of the frame D are hinged two plates, $jj$, toothed or serrated at their free edges, where they bear upon the faces of the zinc. These serve to hold the zinc in the frame, and the many points of the teeth serve to insure electrical contact. These plates $j$ stand at an angle, and the weight of the zinc only tends to make them grip the zinc the tighter. They may be provided with springs to cause them to press elastically on the zinc, in which case it would be best to provide them with thumb-pieces or handles, so that they might be held open for convenience in inserting the zinc. The electric-circuit connection may be made with the zinc through the stud $i$, frame D, and plates or jaws $j$.

E is a plate, preferably of hard rubber, and provided with a packing plate or strip, $k$, of softer rubber or other suitable yielding material, secured to its under side in the manner of a facing. I usually secure the plates E and $k$ together with cement; but other means of attachment may be employed. This plate E is designed to serve as a hydrostat to close the aperture $a$ when the zinc has been removed, as seen in Fig. 3. It is hinged to stud $f$ at one end, under the frame D, and is provided with a slot, $l$, like the slot $g$ in said frame, so that it may be readily removed from said stud. In its free end is a notch, $m$, which engages stud $i$ when the plate E is moved in under frame D, so as to cover aperture $a$.

In the frame D (see Fig. 5) is pivoted at $x$ a latch, $n$, arranged to take over the edge of the plate E when it is moved in under the frame D, and thus secure the plate and frame together. Neither can be moved until this latch is disengaged, because the notches $h$ and $m$ in the frame and plate respectively engage stud $i$ from opposite sides. By means of nut $i'$ the frame D and plate E may be clamped down firmly on the cover and the aperture $a$ tightly closed. In order that the notched end of frame D may have a support when the zinc is in place and the plate E turned aside, I form a shoulder on stud $i$, as seen in Fig. 3$^a$, and make notch $h$ to fit the smaller upper section of said stud, while notch $m$ is made wider in order to fit the larger lower section of said stud $i$.

As the liquid is poured into the receptacle A through the aperture $a$, the hinging of the zinc-holding frame D, so that it may be turned out of the way or readily removed, is a great convenience, and avoids the dripping of the liquid on the metallic holder.

I do not wish to limit myself in all respects to the particular construction and arrangement herein shown, as these may be varied to some extent without materially departing from my invention.

I am aware that it is not new to connect metallic conductors with carbon elements of batteries by the embedment of their ends therein, and that platinum and other non-oxidizable metals have before been employed to insure the electrical contact of the carbon with such conductor. These features I do not broadly claim.

Having thus described my invention, I claim—

1. A battery-cell provided with an aperture for the insertion of the zinc, and with strippers of rubber or other similar yielding and elastic material arranged at the margin of said aperture in position to bear elastically upon the zinc, as set forth.

2. A battery-cell provided with an aperture for the insertion of the zinc, and with elastic flaps $e\ e$ and $e'\ e'$, arranged at the four sides of said aperture and projecting beyond the margins of same into the path of the zinc, substantially as set forth.

3. A battery-cell provided with an aperture for the passage of the zinc, and with flaps $e\ e$, of rubber or other similar elastic material, arranged at the sides of said aperture and extending out and meeting in the path of the zinc, as set forth.

4. A battery-cell provided with an aperture for the insertion of the zinc, and with flaps $e\ e$, of rubber or other elastic material, arranged at the sides of said aperture and projecting into the path of the zinc, said flaps being provided with downwardly-projecting ribs $e^2$ on their free edges, substantially as set forth.

5. The combination, with the cover of the cell, of the carbon C, provided with a metallic bar or piece, $c$, embedded in its substance near its point of attachment to the cover, and an attaching-screw extending through the cover and into said carbon and connected to said metal piece c, substantially as set forth.

6. The combination, with the cover of the cell, of the flat, broad carbon C, provided with a metallic bar, c, embedded in its substance and extending edgewise through its body, as set forth, a thin strip of platinum, p, coiled around said bar c, and attaching-screws which extend through said cover and screw into said metal bar, substantially as set forth.

7. A battery-carbon, C, provided with a metallic bar or piece, c, embedded in it near its point of attachment, and with a covering, d, of rubber or other similar impervious substance, arranged over that portion of the carbon in which said piece c is embedded.

8. The combination, with the receptacle of the cell and its cover, of the carbon C, provided with a metallic piece or bar, c, embedded in its substance near its point of attachment to the cover, and an attaching-screw, b, which passes through the cover and screws into said piece c, substantially as set forth.

9. A battery-cell provided with a zinc-holder hinged to its cover, whereby said holder may be turned out of the way in filling or emptying the cell.

10. A battery-cell provided with a zinc-holder hinged to its cover and made readily detachable therefrom, as set forth.

11. A battery-cell provided with an aperture for the insertion of the zinc, and with a zinc-holder comprising the frame D, hinged to said cell, and the serrated plates j j, hinged to said frame, substantially as set forth.

12. A battery-cell provided with a removable cover which has an aperture for the insertion of the zinc, and said cover provided with a hinged plate, E, to close said aperture, and a hinged frame, D, to hold the zinc, substantially as set forth.

13. The combination of the receptacle and its removable cover, the latter provided with the studs f and i and nut i', the closing-plate E, faced with soft material, k, and hinged on stud f, and the frame D, hinged on stud f over plate E, and provided with the serrated plates j, substantially as set forth.

14. The combination of the receptacle-cover of the cell, provided with the stud i and its nut, and the hinging-stud f, having a laterally-projecting head, f', of the frame D, provided with a slot, g, as described, for the passage of the head f', and a notch, h, to engage the stud i, and said frame also provided with the serrated plates j, substantially as set forth.

15. The combination, with the plate E, provided with a notch, m, and faced with soft material, k, of the frame D, provided with the latch n and notch h, and the cover to which said plate and frame are hinged, provided with a stud, i, and its nut, substantially as set forth.

16. The combination, with the cover of the cell, provided with an aperture, a, for the insertion of the zinc, of the covering-plate E and the zinc-holder hinged on an axis common to both, the hinging-axis being perpendicular to the surface of the said cover, substantially as set forth.

In witness whereof I have hereunto signed my name in the presence of two subscribing witnesses.

J. RANDOLPH HARD.

Witnesses:
 HENRY CONNETT,
 J. D. CAPLINGER.